United States Patent [19]
Landecker et al.

[11] Patent Number: 5,654,549
[45] Date of Patent: Aug. 5, 1997

[54] SATELLITE FOCAL PLANE ARRAY IMAGER

[75] Inventors: Peter B. Landecker, Manhattan Beach, Calif.; Richard C. Savage, Franktown, Colo.; Marion N. Todd, Monrovia, Calif.

[73] Assignee: Hughes Electronics, Los Angeles, Calif.

[21] Appl. No.: 650,575

[22] Filed: May 20, 1996

Related U.S. Application Data

[63] Continuation of Ser. No. 278,745, Jul. 22, 1994, abandoned.

[51] Int. Cl.⁶ ..................................................... G01J 5/00
[52] U.S. Cl. ........................................... 250/332; 348/208
[58] Field of Search .............................. 348/208; 250/332

[56] References Cited

U.S. PATENT DOCUMENTS

| | | | |
|---|---|---|---|
| 3,952,151 | 4/1976 | Jenkin | 348/208 |
| 4,679,753 | 7/1987 | Landecker . | |
| 5,012,347 | 4/1991 | Fournier | 348/208 |
| 5,124,938 | 6/1992 | Algrain . | |
| 5,129,595 | 7/1992 | Thiede et al. . | |
| 5,204,818 | 4/1993 | Landecker et al. . | |
| 5,248,979 | 9/1993 | Orme et al. | 342/58 |
| 5,276,319 | 1/1994 | Hepfer et al. | 250/208.1 |
| 5,300,780 | 4/1994 | Denney et al. | 250/342 |
| 5,430,480 | 7/1995 | Allen et al. | 348/208 |

FOREIGN PATENT DOCUMENTS

| | | |
|---|---|---|
| 0141665 | 5/1985 | European Pat. Off. . |
| 0247265 | 12/1987 | European Pat. Off. . |
| 0413593 | 2/1991 | European Pat. Off. . |
| 0427706 | 5/1991 | European Pat. Off. . |
| 0573309 | 12/1993 | European Pat. Off. . |
| 38 22 265 | 3/1989 | Germany . |
| WO-84/04175 | 10/1984 | WIPO . |
| WO-86/01592 | 3/1986 | WIPO . |
| WO-86/01593 | 3/1986 | WIPO . |

OTHER PUBLICATIONS

Algrain, M.C.; "Gyroless line-of-sight stabilization for pointing and tracking systems" *Optical Engineering;* vol. 33, No. 4; Apr. 1994; pp. 1255–1260.

*Primary Examiner*—Constantine Hannaher
*Attorney, Agent, or Firm*—Elizabeth E. Leitereg; Terje Gudmestad; Wanda K. Denson-Low

[57] ABSTRACT

An imaging system is attached to a satellite, the imaging system includes a transmitting segment which transmits a field of view of photonic radiation to a focal plane array imager. Displacements such as jitter and drift are capable of being applied to the imaging system, which can result in apparent movement of said field of view applied to the focal plane array imager. A stabilizing segment limits the apparent movement of the field of view detected by said focal plane array imager in two orthogonal sensed translational directions, and about a sensed rotary direction.

16 Claims, 6 Drawing Sheets

SATELLITE FOCAL PLANE ARRAY IMAGER

CROSS REFERENCE TO RELATED APPLICATIONS

This application is a continuation of U.S. patent application Ser. No. 08/278,745, filed Jul. 22, 1994, now abandoned.

FIELD OF THE INVENTION

The present invention relates to focal plane array imagers, and more particularly to the use of focal plane array imagers which are mounted on satellites in such a manner as to provide a steady image which can be directed as desired.

BACKGROUND OF THE INVENTION

There are many applications where reliable imagers located in space can provide important information. Two examples of these applications include weather monitoring and strategic military surveillance. In both of these applications, it is important for high resolution images to be transmitted to the Earth in a very short period of time. For example, tornadoes develop so quickly that a weather image transmission technique, in which images can be transmitted within a few minutes, provides very important information.

It is desirable that any satellite imager be relatively light, take up little space, and use little power. The size and weight of the imager is especially important during deployment where added satellite weight may result in a more expensive and/or difficult launch. Present scanning imagers are relatively large, bulky, complex, and expensive. The present scanning imagers require relatively complex mechanical devices for scanning.

Most present remote sensing satellites utilize scanning imagers. The scanning imagers mechanically image one pixel at a time across a first row. As soon as the transmission is completed across the first row, the process is repeated in a second row, and so on until each row in the image is transmitted. The entire process of scanning, transmitting, and receiving a complete image can take more than twenty minutes. Since each detector spends very little time scanning each location (pixel), it is difficult to provide radiometrically accurate information at each pixel location. The equipment associated with these scanning systems is also relatively expensive. The problem with creating an image over a period as lengthy as tens of minutes is that the field of view of an imager at the beginning of the period is often different from the objects in its field of view even a few minutes later. For example, low earth orbit satellites travel a considerable distance over the Earth's surface during a one hour period, and it requires up to 12 hours for the same satellite to be located over the same geographic location to permit it to be re-imaged. It is therefore very difficult to co-register multiple images since co-registration requires multiple exposures of substantially the same field of view.

Since satellite imagers (also known as cameras) typically have many different functions, it is desirable that the imagers can be applied to sense different objects and conditions. Applying a single imager to one or more objects often requires a single imager to detect photonic radiation of differing wavelength ranges. It is often preferred that a single scene be imaged at different photonic radiation wavelength ranges to provide certain information relating to the object. Some of the desired wavelength ranges are in the visible photonic radiation range, while others may be in the infrared radiation range. Imagers which can detect a wide wavelength range of photonic radiation ranges often require the use of multiple imagers with distinct equipment or filters associated with each imager. It is difficult and expensive to provide a plurality of scanning imagers in a single satellite when each scanning imager takes up considerable space and weight.

The need for more timely imaging data, while providing similar quality images, is always desired. In some applications, it is desirable to be able to transmit complete images to the Earth within as little as one minute after the first pixel is imaged aboard the satellite. Current data imagers can not provide an accurate image within this time frame.

One difficulty with applying focal plane array imagers to satellites is lack of technique to precisely aim the focal plane array imager. In low earth orbit satellites, for example, the satellite travels at a high velocity with respect to fixed points on the Earth (or another planet) as the satellite orbits around the Earth (or another planet). This high rate of speed, and the associated jitter and drift, can result in blurred images even when they are exposed at high speeds. There must be some technique to precisely aim the staring focal plane array imager at some fixed location on the Earth's surface as the satellite orbits about the Earth, and keep the imager from recovering a distorted image. This aiming process requires adjusting the imager with respect to the satellite. Aiming of the staring focal plane array imager in satellites almost always occurs remotely from the satellite (or spacecraft) at some ground-based location. Continuous repeated observations of a single location on Earth by a small number of low earth orbit staring focal plane array imagers represents a considerable challenge.

A second difficulty with applying focal plane array imagers to the satellite application is that satellites produce a high frequency vibration known as jitter. Jitter is typically produced by variations of moving parts such as attitude control mechanisms or any other vibration producing mechanism located aboard a satellite. Jitter usually occurs at such a high frequency that attempts to create a highly magnified image using a staring or scanning imager mounted on a communications spacecraft result in a blurred image or subsequent comparison images in which the "same" earth location is displaced. Additionally, satellite focal plane array imagers drift with respect to a feature being imaged. Drift is a more gradual movement than vibration with the actual image Field of View (FOV) displaced from a desired image FOV. Jitter and drift, by themselves, have limited prior art attempts to apply staring focal plane array imagers to satellite applications.

A third problem with applying focal plane array imagers to spacecraft applications is that there must be some technique to control the temperature of the staring focal plane array imagers, especially when infrared radiation is being imaged to ensure proper operation of the imagers. Non-infrared staring focal plane array imager detectors do function well (exhibit a suitable signal to noise ratio) at the range of temperatures likely to be encountered in space. However, infrared staring focal plane array imager detectors must typically be cooled to below 100 degrees Kelvin to produce sensitive, accurate, and reliable imaging.

It would be desirable to be able to utilize imagers of relatively simple construction in satellite applications, which can also transfer images at a rapid rate. Prior art staring focal plane array imagers represent such a simple construction. Staring focal plane array imagers sense values for all the pixels of an entire image simultaneously over a very brief period, store the image in a data file, and transmit the data of the single image at whatever rate is desired. However, there are some difficulties with the characteristics of staring focal plane array imagers which limit these imagers from being used in satellite applications.

A desirable feature in making multicolored exposures, or for measuring a changing environment, is to be able to overlay time phased scenes. It is also desirable to be able to correlate successive images, which requires the imager to be very stable. Unfortunately, satellites which are partially dedicated to communication, and other tasks do not require the high stability required for sophisticated imaging, are often allowed to drift within a maximum allowable angular dead band in both attitude and location. Jitter and drift values that are acceptable for communication satellites are often outside the range permissible for scientific or observation imagery systems. To utilize available platforms, the stability problem must be overcome in order to be able to greatly improve such important applications of satellite images, which require rapid imaging, such as the calculation of dynamic motion fields (including wind and vapor fields), vorticity, and divergence for numerical forecast models, and short range forecasting.

From the above, it can be understood that even though focal plane array imagers have many characteristics which make their application to satellites desirable, it is also necessary to remedy some of the problems inherent in these imagers prior to their application to space environments. The present invention provides solutions to many of these above problems.

SUMMARY OF THE INVENTION

The foregoing and other problems are overcome by an imaging system attached to a satellite, the imaging system includes a focal plane array imager which images a field of view of photonic radiation. The focal plane array imager is mounted to a mount within the imaging system (not shown). Displacements such as jitter and drift are capable of being applied to the imaging system, which can result in apparent movement of said field of view applied to the focal plane array imager. A stabilizing segment limits the apparent movement of the field of view detected by said focal plane array imager in two orthogonal sensed translational directions, and about a sensed rotary direction.

Certain embodiments of the present invention include an inertial sensing segment that senses any changes in the camera telescope orientation in inertial space. The rotation sensed is fed as an error to the sensor rotation servo segment, which rotates the sensor to reduce the error to an acceptable level. The jitter and drift segment of the inertial error is sent as a signal to the inertial processing segment of the control system where it is transformed mathematically to the mirror coordinates for correction. This signal is fed to the mirror pointing segment as an error signal. The two axis mirror servo segment drives this error down to an acceptable value. The reflected image is then stable in all coordinates before it is incident on the focal plane array.

It is very desirable to provide a satellite configuration in which a satellite imager can be piggy-backed on a communication satellite, without overly affecting the operation of the communication satellite. The present invention relates to a low-cost, simple satellite image creating system that produces image data for needs not met by present systems. The present invention has three attributes that make it attractive, where there is little or no competition from prior art devices.

First, the present system is inexpensive enough that it can be frequently deployed. Lower cost for military, weather, and environmental monitoring is important since satellite programs can be extremely expensive. Imager assemblies of the present invention may cost up to two orders of magnitude less than certain prior art scanning imaging systems which they replace.

A second attribute of certain embodiments of the present invention is the capability for relatively rapid imagery. This is important for timely coverage of severe storms for weather prediction as well as a multitude of other applications. The present invention provides much quicker image transmission capabilities than the prior art.

A third attribute of certain embodiments of the present invention is that the present invention provides color (and multiband IR) imagery with good spatial resolution. The signal processing capabilities of the present invention also provides radiometric correction and image enhancement capabilities. These image improvements are especially important for TV broadcasters, crop and forest assessment, weather forecasters, military assessment, and support of remote sensing projects. Focal plane arrays can be used as detectors in conjunction with autonomous imager pointing and jitter suppression corrections as well as on-board data compression and wavelength band selection.

Because the imagery of the present invention can be in color, by co-registration of multiple visible images of substantially the same scene taken at different wavelength ranges (taken with a red, blue, and green filter) viewing of images created from the returned data is very attractive for TV viewing. For example, imagery can show drought-stricken or flooded or wildfire areas changing color over time, etc. The image processing of the present invention can also support local weather programs about storms, weather watches, etc.

The present invention is capable of providing a unique insight into monitoring of weather which is changing rapidly, such as severe thunderstorms, hurricanes, and damaging winds, which are of special concern to Department of Transportation and certain civil transportation industries. As an example, current Doppler radar systems detect storm development only after the storm begins to produce rain. Sixty minutes are typically required from that point to perform a volume scan that detects the raining cloud mass. On the other hand, the present invention can view the first inception of the system's cloud, and its rate of development and direction of motion can be calculated 5 to 30 minutes earlier than with Doppler systems. The fact that the imaging system of the present invention permits planet monitoring over different photonic radiation bands can be used to provide considerable significant information.

Taking advantage of the typical one minute period required to provide an image, the present invention can monitor winds using cloud element motions. This provides wind information over broad regions of the world where knowledge of upper air winds are not readily accessible. This provides valuable information for aircraft and weather forecasting. Wind vectors from cloud motion are often in error at higher altitudes because radiant energy from below leaks through the thin clouds. This error can be reduced by stereo observation which provides three dimensional imaging as described below. The imaging system of the present invention can provide stereo geometric estimates of cloud height, leading to better aviation support and better wind measurements and forecasts.

Electronic imaging of the present invention can be conveyed by present generation communication satellites. The present invention provides a relatively inexpensive option to image weather patterns below the location of the satellite. The present invention therefore makes overall use of communication satellites more attractive and competitive by allowing each satellite to perform more functions.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

The specific configuration, dimensions, and materials used in the imagers (cameras), filters, and other structure described in the present disclosure is intended to be illustrative in nature and not limiting in scope. The imager transmission rate depends partly upon the specific focal plane array configuration, and the bandwidth permitted for transmission from the satellite to a receiver it is transmitting to (e.g., part of the telemetry stream, transmitter or part of a communications transponder). The use of the term "satellite" within this disclosure is intended to cover any spacecraft, manned or unmanned, to which an imager may be attached. The satellite may be geostationary, in low planet orbit, or in any other attitude relative to the Earth or another planetary or stellar body.

Figure 1:
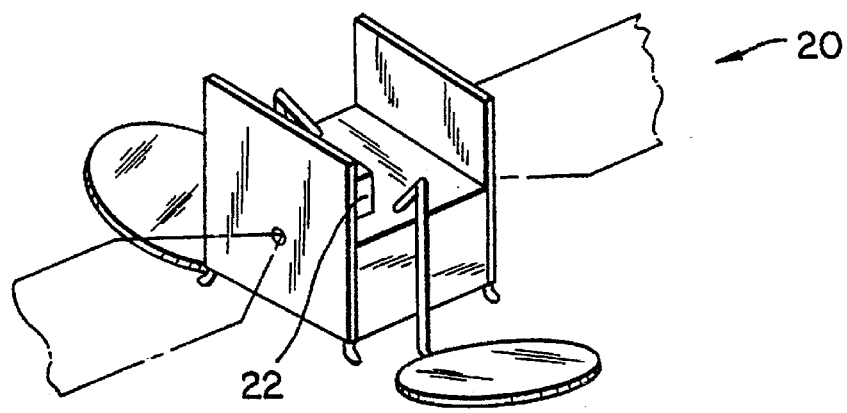
FIG. 1 is a perspective view of a communication satellite 20 with one embodiment of imaging system 22 of the present invention mounted thereupon.
Figure 2:
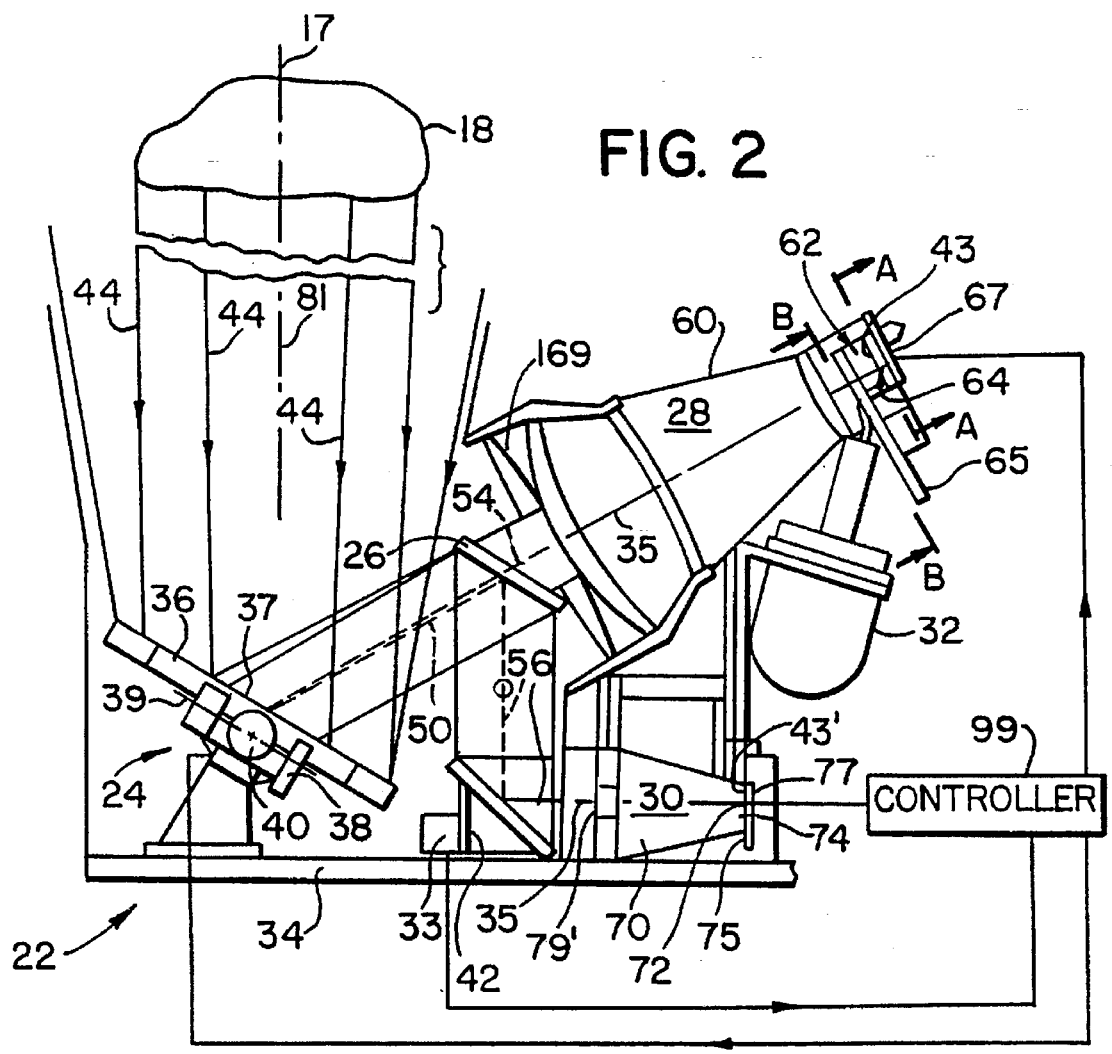
FIG. 2 is a partial cross sectional view of one embodiment of the imaging system 22 is illustrated in FIG. 1.

FIG. 1 is a view of a satellite 20 which contains an imaging system 22 mounted thereupon. The present invention is associated primarily with the imaging system 22. An enlarged view of the imaging system 22 is illustrated in FIG. 2. The imaging system 22 includes a pointable mirror system 24, a folding mirror 26 (or full aperture dichroic mirror to allow for collecting a larger visible beam), an infrared radiation (hereafter referred to as IR) imager assembly 28, a visible radiation (hereafter referred to as VR) imager assembly 30, a cryo-engine cooler 32, and a 3-axis inertial sensor 33 (which is possibly constructed with three long life spherical resonant gyroscopes). Even though the imaging system 22 is illustrated with a single IR imager assembly 28 and a single VR imaging assembly 30, any desirable and suitable numerical combination of IR imaging assemblies and VR imaging assemblies is intended to be within the scope of the present invention. Each of the above components of the imaging system 22 are mounted directly, or indirectly, to an optical bench 34. The optical bench 34 is secured to the satellite 20 through flexure mounts and a piston type driver to rotate about the line of sight (LOS) to correct for satellite rotational errors. The mirror portion 24 can be repositioned using the mechanisms described below to ensure that a corrected desired image is presented in both the IR imager assembly 27 and the VR imager assembly 30. Note that the mirror moves in a manner to compensate for jitter and drift.

There are several reasons why a distinct 3-axis inertial reference unit (IRU) system 33 is utilized by the imager assemblies 28, 30 instead of the satellite gyros. First, the 3-axis inertial reference unit of the imager should be much more accurate (capable of measurements within a fraction of a pixel) than navigation gyro used on typical communications spacecraft. The accuracy of the present invention is required since it is important to compensate for satellite bending and twisting as well as the motion of a satellite that causes distortion as small as a fraction of a pixel. The gyro system of most communication satellites, for example, is not required to have the accuracy necessitated by co-registration of optical images over time for meteorological land resources or scientific imaging measurements.

The second reason for using the distinct 3-axis inertial reference unit 33 instead of the satellite gyro system is that the navigational gyros on spacecraft typically have a relatively short design lifetime since these are only intermittently used for navigation of the satellites. For example, satellite navigational gyros are turned on only at those times that the location changes of the satellite is being determined. The 3-axis inertial reference unit must provide reliable and continual operation over the extended periods that the imager is being used.

Third, it is important to have the 3-axis inertial reference unit 33 located in close proximity to the imager, since the satellite itself undergoes twisting and deformations. In those instances where the satellite gyro system is located in a remote section of the satellite from the imager, as is usually the case, the satellite gyro system can be displaced relative to the imaging system 22, and is therefore not able to precisely sense the position or motion of the imaging system 22 in inertial space.

The imaging system 22 of the present invention is either applied to a satellite which is only being used to generate images (stand alone satellite), or as an addition to a communication or scientific exploration satellite. Many present generation communication satellites are configured to be capable of carrying the imaging system 22 of the present invention. A Hughes HS-601 satellite, for example, measures 7.5 m across with its oval antennas deployed, and 26 m long from the tip of one four-panel solar array wing to the tip of an opposed solar array wing. These arrays generate a combined 4300 W of electrical power, backed up by a 32-cell nickel-hydrogen battery for power during eclipse. The dimensions and electrical consumption of the imaging system 22 is small by comparison, and the inclusion of the imaging system 22 does not significantly affect the normal operation of the satellite.

Stabilization System

If the imaging system of the satellite 20 is taking one or more images at a relatively high rate such that the imaging system remains focused on virtually the same planetary scene or field of view, then multiple images can be taken and the multiple images are co-registered. The planar mirror is then moved resulting in a change in the planetary scene or field of view which the imaging system views; and another one or more images are then taken in a similar manner. The pointable mirror system 24 permits the imager planetary scene or field of view to point to any field of view which is not limited by physical constraints (such as a physical limitation imparted by the satellite or camera mounting). In order to ensure that multiple successive images can be taken of the same field of view within a fraction of a pixel accuracy, it is important to provide a stabilizing portion which compensates for jitter and drift type motions imparted to the imaging system.

As the photonic radiation 44 (from some field of view such as a planetary scene which the imaging system 22 is directed at) is reflected off the planar mirror 36, it passes along a radiation path 50 until it encounters the dichroic mirror 26. The dichroic mirror 26 divides the photonic radiation from the sensed field of view represented by radiation path 50 into a first split radiation path 54 and a second split radiation path 56 depending upon the wavelength of the photonic radiation passing along the radiation path 50. For example, almost all of the photonic radiation above a predetermined wavelength is passed along the first split radiation path 54 to the IR imager assembly 28, while almost all of the radiation below that wavelength is passed along a second split radiation path 56 to the VR imager assembly 30. In this disclosure, the term "IR radiation" is defined as radiation within the 1–15 µm wavelength range. The term "visible radiation" is defined as that radiation within the 0.4–0.9 µm wavelength range. An IR imager assembly 28 senses photonic radiation primarily within the IR range. A VR imager assembly 30 senses photonic radiation primarily within the VR range.

Any apparent motions of the object 18 (which may be considered as a point a long distance from the imager array in satellite applications) in the field of view of any imaging array of the imaging assemblies 28, 30 can be defined by three component motions. Any of the following apparent motions can result in a blurred image. The first component of the apparent motion is a translational apparent motion that makes it appear to the imager assemblies 28, 30 that the object 18 is moving to the left or right in FIG. 2. This apparent motion is produced by the imager rotating clockwise or counter-clockwise, respectively. The second component of the apparent motion is also a translational apparent motion that makes it appear to the imaging assemblies 28, 30 that the object 18 is moving in and out of the paper in FIG. 2. This second component of apparent motion results from the imaging system 22 rotating about axis 81 which is generally parallel to the direction of travel of the photonic radiation 44 as illustrated in FIG. 2. The third component of the apparent motion is a rotational apparent motion that makes it appear to the imaging assemblies 28, 30 that the object 18 is rotating about an axis 17 that is generally parallel to the axis 81. Other apparent motions of the object relative to the imaging system cannot be sensed by the imaging arrays simply by change of shape since a two dimensional sensor array cannot sense depth.

Each of the above three components of apparent motion typically occurs at the same time. The above described first, second, or third components of apparent motion may be produced by jitter and drift which occurs at very high frequencies compared to the normal imaging rate. This high frequency displacement results in blurred images (apparent motion) being created by each imaging assembly 28, 30.

The pointable mirror system 24 (also referred to as a pointing system) includes a planar mirror 36 which is mounted on a two-axis mirror gimbal 38. The planar mirror 36 can thereby rotate about two axes 39, 40 using the two-axis mirror gimbal 38 to precisely control an attitude of the planar mirror 36 is positioned with respect to the satellite 20. The planar mirror is rotated about the appropriate axis 39, 40 to correct for the two above described translational apparent motions. Depending upon the attitude of the planar mirror 36, photonic radiation (indicated by arrows 44) from some planetary or stellar object 18 (the field of view) is projected onto the IR imager assembly 28 and/or the VR imager assembly 30, and the image is created using certain devices described below.

Figure 9A:
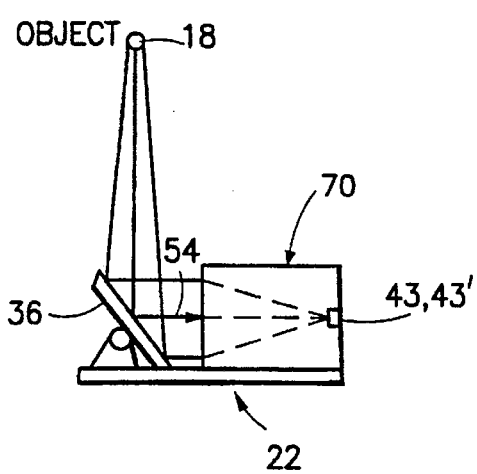
FIG. 9a is a schematic illustration of relative positioning of an object, the imaging system 22, the mirror 36, and the imager array 43 when a reflection of the object is centered is centered in the imager array.
Figure 9B:
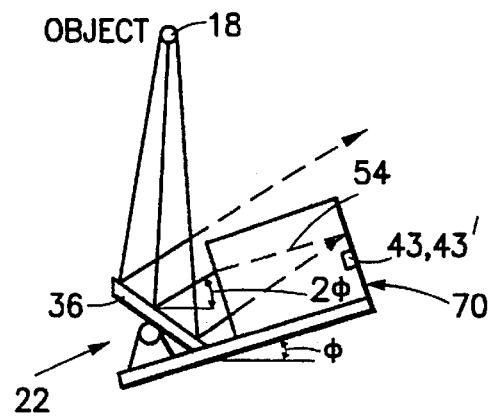
FIG. 9b is similar to FIG. 9a, but with the imaging system rotated, and the mirror is uncorrected.
Figure 9C:
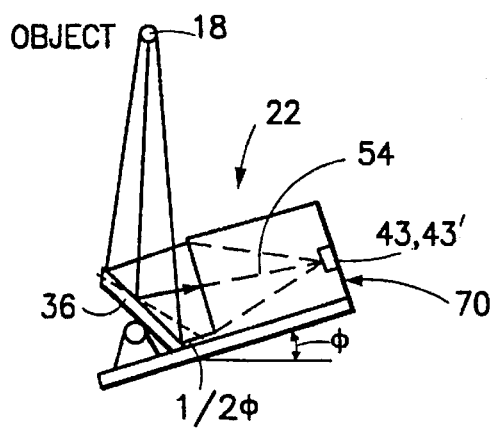
FIG. 9c is similar to FIG. 9b, but with the mirror corrected such that the reflection form the object is re-centered in the imager array.

FIGS. 9a to 9c illustrates a progression of schematic illustrations relating to the angling the mirror 36, about one of the axes 39, 40, relative to the imaging system 22 when the imaging system 22 rotated with respect to the object 18 centered in the field of view, in order to maintain the object centered in the imager array 43. This is the circumstance which produces translational motion as described above. In FIG. 9a, the photonic radiation transmitted from the object, which reflects off the mirror 36 is directed at the imager array 43. Between FIGS. 9a and 9b, the imaging system rotates $\phi$ degrees counterclockwise, and the planar mirror remains fixed with respect to the imaging system. The photonic radiation from the object is reflected $2\phi$ from its FIG. 9a path, which results in the apparent translational motion to the imager assembly 43 (illustrated as displacement of the first split radiation path 54 within the IR lens structure 60 (a similar configuration occurs in the VR lens structure 70). The rotation of the imaging system 22 is usually much smaller than that illustrated in FIG. 9b; the large angle $\phi$ is selected to more clearly display the concepts of the present invention. In order to correct for the FIG. 9b displacement, the mirror 36 is rotated counterclockwise by $\frac{1}{2}\phi$ as illustrated in FIG. 9c. This counterclockwise rotation is sufficient to re-center the reflection of the object 18 in the imager array 43. This mirror adjustment process is accomplished thousands of times per second in the present invention, at a rate where the apparent motion of the object 18 is very small, and the desired object or planetary scene remains centered in the field of view. As is apparent from FIGS. 9a to 9c and the above discussion, in order to compensate for translational apparent motion of the object, the mirror has to be rotated in the opposite direction of rotation of the imaging system, but at a specific fraction of an angle determined by coordinate transformations of the incident angle.

The on-board three-axis inertial sensor 33 (which is typically an inertial reference unit) with active feedback (FIG. 5) to the pointable mirror system 24 provides information relating to imager system motion. This detection is performed at a sufficient rate to detect attitude jitter and motion. When the jitter and drift is corrected for, accurate co-registration of images taken in short periods of time (of the same or different radiation wavelength) can be performed. The inertial sensor 33, which is preferably formed as a set of three orthogonal hemispherical resonant gyros, is mounted directly on a housing mounting structure 42 which is preferably close to or part of, the imaging system 22. Signals from the three orthogonal gyros provide translational as well as rotational information to the imaging system.

The other component of apparent motion which must be corrected for to limit blurriness of the images created by the imager array 43 is the rotational apparent motion. This apparent motion appears as rotation about the nadir of the imager array 43. The nadir 35, 35' is defined as the axis parallel to the line-of-sight of the imaging array 43, 43'. Since the planar mirror is planar, it cannot correct for rotational apparent motion, since rotating the planar mirror will not alter the image within the imager array 43.

Figure 7:
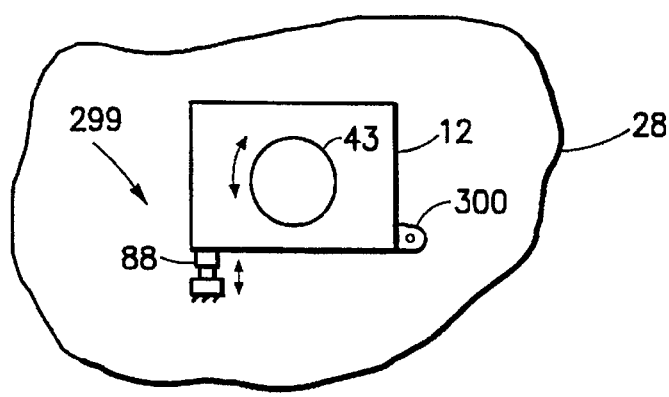
FIG. 7 is a view taken along section lines A—A of FIG. 2 of one embodiment of a flex pivot segment (67, 77) which permits rotation of the imaging system about its nadir axis.

A piston type driver 88 (see FIG. 7) permits the imager assembly 28 to correct for rotational apparent motion of the imaging system. This type of apparent motion results when the satellite is rotating about the axis 81 of the planar mirror 36, resulting from jitter and drift or other motion. The satellite motion about the nadir 35 (or 35' in the imager array 43), which is in the order of ½° in angle, is compensated for, in the IR imager assembly 28 and the VR imager assembly 30, by rotating an IR imager array 43 and VR imager array 43', respectively, about the nadir 35, 35' by use of a linear motion device 299 of FIG. 7. FIG. 7 is taken along sectional lines A—A of FIG. 2. The FIG. 7 flex pivot 300 and the piston 88 combination permits stabilization about one axis of the IR imager array 43 by rotating a camera 12 (which the imager array 43 is located within) upon actuation of the piston 88. This angular adjustment may be accomplished quickly enough to compensate for jitter and drift. Since jitter and drift account for relatively small angular displacements, the extendable piston 88 will only have to change the angle 90 a relatively small amount.

Figure 5:
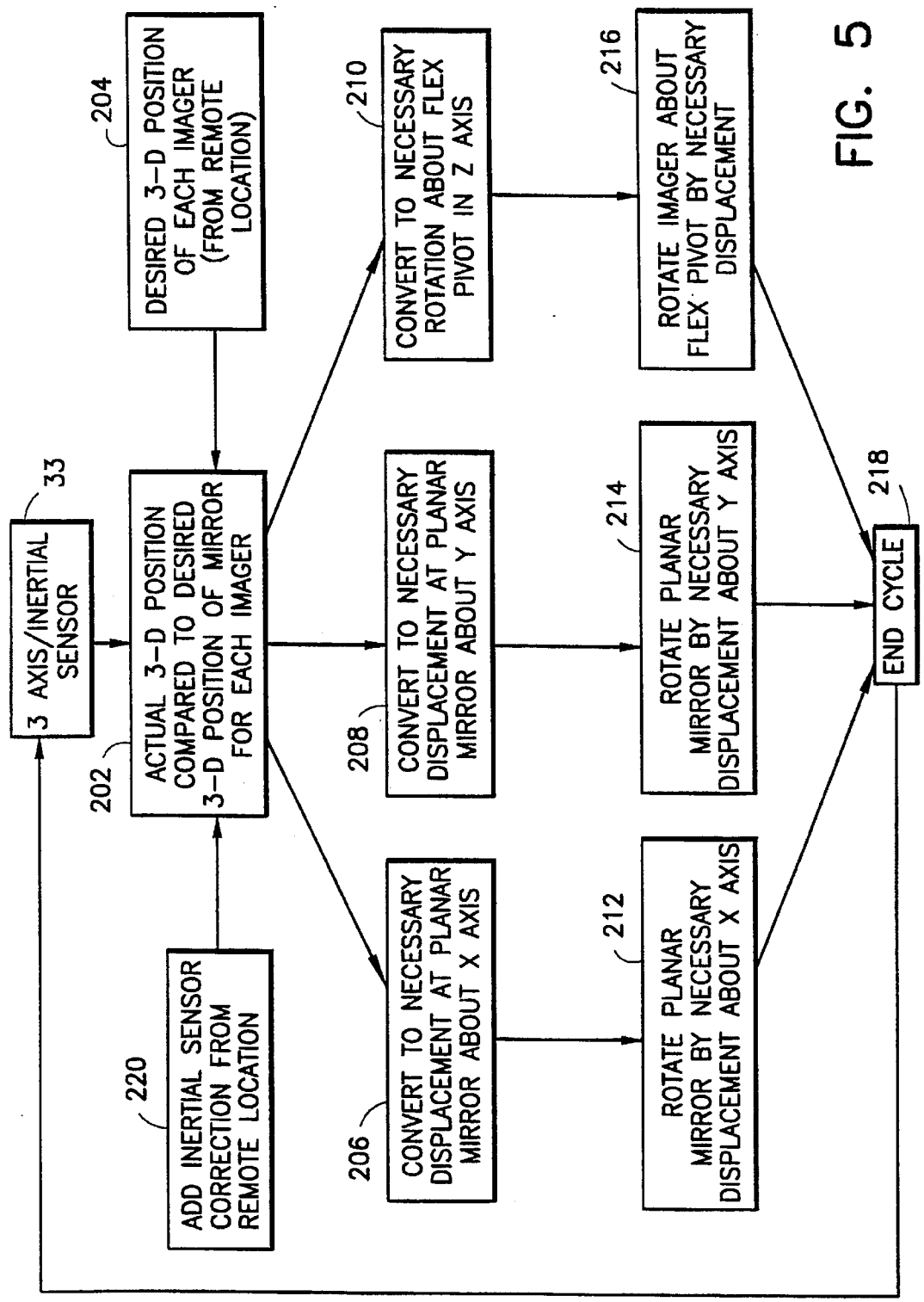
FIG. 5 is a flow chart illustrating the operation of the stabilized imager system of this invention.

The pointable mirror system utilizes the planar mirror 36 that is stabilized to each of the pivot axes 39, 40 utilizing the 3-axis inertial sensor 33. This stabilization is produced by a controller 99 of FIG. 2 (typically a microcomputer or microprocessor) running a control loop as illustrated in FIG. 5. The FIG. 5 control loop acts to receive commands describing a desired position of the planar mirror 36. The FIG. 5 closed loop performed by the controller 99 is performed at an empirically determined rate sufficient to maintain a difference between the actual and the desired position (in the three orthogonal directions) of the IR imaging system at almost zero.

Precision resolvers and analog-to-digital (A/D) converters are calibrated to detect apparent motion to the imaging arrays. The resolvers and A/D converters permit servo motors to be actuated by the electronic controller 99, as described below with respect to FIG. 3. For example, if it is desired to displace the image by an angle, in a direction to cover a different area on the Earth's surface; it is necessary to displace one or more of the servo motors a previously computed distance (calibrated as angular steps). The displacement of the servo motors result in the planar mirror 36 being rotated by some corresponding radial angle. The coordinate transformation from inertial space to mirror angle is accomplished by the electronic controller and fed to the servo as a pointing error which the servo strives to reduce to zero. Pointing stabilities of the planar mirror (of the order of ¹⁄₁₂ pixel for the IR imager assembly, and ¹⁄₁₂ to ⅓ pixel for the visible light imager assembly), is achievable by the present invention utilizing commercially available components.

The specifics of how much each torque motor must be displaced along each of the three axes 39, 40, 81, to compensate for spacecraft motion, depends upon the specific configuration of the pointing system. The configuration of the pointing system is determined by actuating each imager assemblies 28, 30 along each axis, then observing the displacement along each of the axes. The displacement is verified by precise measurements. An imaging system which compensates for spacecraft drift and jitter experiences a steady image regardless of motion of the satellite (providing that the motion remains within a reasonable range).

Figure 8:
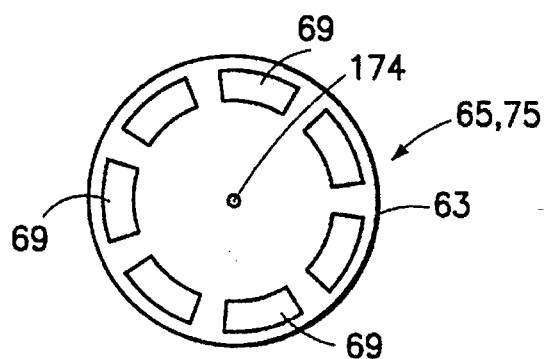
FIG. 8 is a view taken along sectional lines B—B of FIG. 2 of one embodiment of the filter wheel 65 of FIG. 2.
Figure 10:
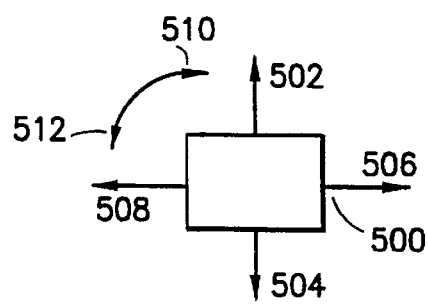
FIG. 10 is a motion diagram of an imager array 500 used in an alternate embodiment of imaging system from that illustrated in FIG. 2.

While the FIGS. 2, 7, and 8 embodiment illustrated a preferred embodiment of the present invention, there are other embodiments of the present invention which provide stabilization about up to three orthogonal axes, and as such are within the scope of the present invention. For example, a configuration could be established to provide motion to an IR imager array along all three axes to compensate for displacements along three axes. For example, the imager array 500 within the imager assembly itself in FIG. 10 is mounted (using any suitable mount, to move up and down in directions 502, 504 with respect to the imager assembly to compensate for the above described first translational apparent motion. The imager array 500 moves in left and right directions 506, 508, with respect to the imager assembly, to compensate for the above described second translational apparent motion. The imager array rotates in rotary directions 510, 512 with respect to the imager assembly to compensate for the above described rotational apparent motion. It is likely that the FIG. 9 embodiment cannot compensate for apparent motion as is the case in the FIG. 2 embodiment. The FIG. 10 embodiment limits all moving elements which provide compensation for the three axis displacement within the respective imager assembly.

IR Imager

The IR imager assembly 28 includes an IR lens structure 60, the IR focal plane array 62, an IR focal plane electronics 64, an IR filter wheel 65, an IR flex pivot 67, and the cryo-engine cooler 32 (or passive radiation cooler—not shown) which is configured to cool the IR focal plane array 62. It is necessary to cool the IR focal plane array 62 to a temperature which permits optimal operation, typically in the 80°–100° Kelvin range. The IR focal plane array 62 and the IR focal plane electronics 64 interact to provide an image in the form of electronic data. The data is transmitted to the controller 99 for further processing and signal transmission as described below. All of the structures of the IR imager assembly 28 and the VR imager assembly 30 have to be able to withstand radiation, temperature variations, and inaccessibility over a relatively long lifetime of typically 5 years in space. The IR focal plane array 62 can be constructed as a Mercury Cadmium Telluride (HgCdTe) charge-coupled detector (CCD) focal plane, which is configured with a preamp (not illustrated). The IR imager focal plane array is preferably a 640×480 HgCdTe CCD with a long wavelength cutoff at least 12 μm.

The IR flex pivot 300 of FIG. 5 includes the previously described FIG. 7 structure to provide responsive rotation of the IR focal plane array 62 of the IR imager assembly 28 to limit blurring in the image created by rotary motion of the satellite about the axis 81 which is around the imager line of sight. This rotation of the IR focal plane array 62 combines with the previously described two dimensional displacement of the planar mirror about axes 39, 40 to provide three dimensional movement of an image created by the IR focal plane array 62.

The IR focal plane array 62 of the present invention is a multi-channel, electro-optic imager that covers at least a desired wavelength range of the IR spectral region. Each individual sensor (not illustrated) of the IR focal plane array 62 has a typical ground resolution of 5 km IR. Image processing techniques, as described below, are used to correct, normalize, compress, and format the data from all of the pixels of the IR sensor array for transmission over a 4800 bps communication link, or to electronically splice the data into a higher bandwidth transponder over a 100 Kbps or 1 Mbps link.

Use of a staring two dimensional IR focal plane array 62 avoids line-to-line image distortion resulting from scanning imagers. This distortion results largely from the image changing as the different lines in a single image are being imaged. Unlike the scanning imagers, the complete frame is recorded simultaneously in staring focal plane array imagers. The need for mechanical moving parts is also eliminated in staring focal plane array imagers. This is true with both the IR focal plane array 62 and the VR focal plane array 72. Limiting the number of movable parts is desirable in satellites where access for repair or lubrication is very difficult or practically impossible.

The IR imager assembly 28 also has one or more multi-position filter wheels 65, as illustrated in FIG. 8, which determines which filter is located in front of the IR imager assembly, and thereby the wavelength range of the IR radiation applied to the IR focal plane array. The VR imager assembly 30 has a filter wheel 75 which is similar to the filter wheel 65, and will not be further detailed. FIG. 8 is a sectional view of the filter wheel 65 taken along section lines B—B of FIG. 2. The IR multi-position filter wheel 65 includes a body segment 63 which rotates about a rotary mount 66, with a plurality of filters 69 mounted in the body segment 63. The body segment 63 can be rotated about the rotary mount 174 whereby one specific filter 69 is aligned with the first split radiation path 54 of FIG. 2, such that a certain wavelength range passes to the IR focal plane array. The different filters are each configured as a band pass filter to permit only IR photonic radiation within a range of wavelengths to pass to the IR focal plane array 62. Since images of different wavelengths can be created of the same planetary scene or field of view, and transmitted very rapidly utilizing the IR imager assembly 28, it is envisioned that multiple images of virtually identical scenes can be processed together providing information about the relative intensities of two or more wavelength bands of radiation co-registered at each pixel. The multiple images can be taken several seconds or less apart by the IR focal plane array 62. This capability is especially useful in weather observation and forecasting applications where the intensity of certain bands of IR radiation, taken alone or combined in some manner with other bands, can provide important information about existing weather conditions.

The number of selectable filter(s) 69 for the IR multi-position filter wheel is a design choice. In addition to the one or more bandpass filters, each filter wheel has two additional wheel positions. One of the additional wheel positions is for dark field to be used for pattern cancellation, and the other is used for flood illumination to balance or normalize or calibrate the response across the field of view. Use of an imager filter-wheel and image sequence buffer 256 of FIGS. 3 and 6, both for the IR and the VR imager assemblies, permits very rapid successive images recorded in the same wavelength band. The filter wheel and image sequence buffer also permit a sequence of selected bands to be recorded in an ordered sequence in order to optimize the rate at which images may be transmitted to users.

There is also an excessive light detector 37 (shown in FIG. 2), which may be mounted adjacent the planar mirror 36, or in some other suitable location. The excessive light detector 37 may be a PIN diode or some other device which detects when an excessive amount of light is being directed at the planar mirror wherein damage can result to the focal plane imaging arrays (as is be the case when the planar mirror is pointing at the sun, for example). When the light detector 37 is actuated, the controller 99 displaces the planar mirror to some remote location to limit excess photonic radiation being directed at any of the imager assemblies 28, 30 which can result in heat loads or other damage thereto. A filter wheel, shown in FIG. 8, can alternatively be moved to the opaque position to limit application of the light to each of the imager focal plane arrays 62, 72 instead of displacing the planar mirror 36 as described in this paragraph. A similar excessive light detector (not illustrated) is included in the VR imager.

VR Imager

The VR imager assembly 30 includes a VR lens structure 70, a VR focal plane array 72, VR focal plane electronics 74, and VR filter wheel 75. The VR telescope mounts to the IR telescope. The VR focal plane array 72 and the VR focal plane electronics 74 interact to create data indicating the photonic intensity incident on the focal plane array. The VR focal plane electronics transmits the electronic data, indicating the photonic intensity of each pixel, to the controller 99 for further processing as described below. The structure and function of the VR focal plane array 72 is very similar to that of a typical video imager, even though the VR imager assembly is constructed form materials compatible with the radiation, temperature variations, and required inaccessibility of the VR focal plane array imager over a relatively long lifetime. A flex pivot 300, which is a similar but smaller mechanism as described with respect to the IR flex pivot described above and illustrated in FIG. 7, is used to provide rotary motion to the VR focal plane array 72. It is also possible to provide a VR zoom lens 79, which magnifies an image of said second radiation path 56, to provide a magnified image to the VR imager assembly 30.

The visible imager focal plane array can be a 2048×4096 pixel charge coupled detector (CCD) or charge injection detector (CID) with usable response from 400 nanometers to 1,000 nanometers. During nighttime operation, the VR imager assembly can be sensitive to illumination created when the moon is at least one quarter full. The VR imager assembly may sense images in color by sensing the photonic intensities of each pixel of nearly the same planetary scene or field of view taken with different VR filters (for example red, green, and blue). Signal processing techniques are applied to determine which overall color best represents each pixel considering the plurality of photonic intensities. For example, if the photonic intensity of a certain pixel in the focal plane array covered by a red filter is very high, while the relative photonic intensities of the associated pixel when the green and blue filters are placed in front of the imager are very low, it can be determined that the planetary scene or field of view at that particular location is red.

Following the signal conditioning by the focal plane electronics, the VR and IR signals are processed identically through the signal chain. Identical 12 bit analog-to-digital converters 252 (see FIG. 6) convert the analog signal to digital data. All fixed pattern cancellation and normalization is done in the digital domain using stored frames of both minimum and nominal illumination levels taken before each data sequence or periodically during long data frames. After normalization, the data is stored in memory for transmission using on board data compression algorithms. Certain 2:1 compression algorithms are lossless, and such compression ratios do not cause perceptible image degradation. The transmission rate for a single-color frame from the VR imager assembly 30 or the IR imager assembly 28 can be 66 seconds, 33 seconds, 13 seconds, or 7 seconds, depending upon the amount of compression permitted in the allotted bandwidth.

The VR imager assembly can use a refractive zoom lens 79' with a zoom range of 6 to 1 (a similar zoom lens 79 is applied to the IR imager—not illustrated). The minimum visible resolution can be 0.94 km. The VR imager assembly beam is folded into the center of the IR telescope in order to use a smaller scan mirror, as shown in FIG. 2.

The VR imager assembly 30 also has one or more multi-position VR filter wheels 75, in which one of a plurality of filters which controls the wavelength range of the VR radiation that is applied to the VR focal plane array 72. The structure of the filter wheel 75 is similar to the filter wheel 65 of the IR imager assembly 28 of FIG. 8, except that the wavelength ranges of each of the filters in the VR imager assembly 30 acts as a bandpass filter to pass only specified ranges of VR, not IR, photonic radiation. The size of the each filter wheel, as well as the number of filters 69 in each filter wheel is a design choice which depends largely upon the size of the imager assemblies 28, 30, and the desired number of detected ranges respectively.

While both the IR and the VR imager assembly descriptions have implied the full use of the focal plane array, it is also possible to utilize only a fraction of the pixels of the focal plane array (every fourth pixel in each direction in activated, for example), and thereby electronically reduce the field of view of the imager assemblies. It is very difficult to accomplish the same zooming results electronically with a scanning imager.

Control Configuration

FIGS. 3, 4, 5, and 6 illustrate block diagrams or flowcharts which indicate the control logic associated with certain embodiments of the present invention. This logic is performed largely in the controller 99 which is located aboard the satellite 20 (FIG. 2). The dotted line 80 of FIG. 3 delineates the functions which are performed within the imaging system 22 itself. The control logic of FIG. 3 may be broken down into a jitter/drift compensation segment 110 which senses, and determines a necessary compensation for spacecraft jitter and drift created aboard the spacecraft; a pointing segment 112 directs the imager assemblies 28, 30 in a desired direction based upon the commands received from the Earth (or wherever the commands are being transmitted from); an imager segment 113 controls the operation of the VR imager assembly and the IR imager assembly; a transmission segment 114 which stores, processes and transmits the digital data representative of images back to Earth; and a command and control segment 115 which transmits commands from the Earth to the imaging system directing certain further operations of the pointing mirror. The further operations include such considerations as which ranges of wavelength the imagers are to receive, how many images are desired to be taken, etc. While the present disclosure refers to the control persons (or computers) being located on the Earth, it is envisioned that the present system may operate if the controllers are located at some remote location.

The jitter segment 110 includes a state of satellite jitter and drift motion 120 aboard the satellite; the 3-axis inertial sensor (illustrated in FIG. 2) which senses the precise position, as well as the amplitude and direction of the spacecraft jitter and drift; an inertial reference control loop for jitter compensation 126; and a third axis imager displacement device 128 (about the third axis 81).

The pointing segment 112 is applied to a planetary scene or field of view 130, and further includes a two-axis imager pointing system 132 (about axes 39 and 40). The planetary scene or field of view 130 depends upon the relative orientation and location between the satellite and the imaging system 22 with respect to the planet (additionally stellar locations are capable of being imaged). Another advantage of the present invention is that the satellite imaging system can use on-board or Earth based information about planetary and stellar locations in obtaining a precise attitude and position of the satellite. An autonomous stellar or planetary imager attitude locating system, which forms a section of the two-axis imager pointing system 132, functions similarly to the system described in U.S. Pat. No. 4,679,753, issued Jul. 14, 1987 to Landecker (incorporated herein by reference in its entirety).

An autonomous spacecraft navigation and ephemeris locating system, which also forms a section of the two-axis pointing system 132, functions similarly to the system described in U.S. Pat. No. 5,204,818, issued Apr. 20, 1993 to Landecker and Savage (incorporated herein by reference in its entirety). The two-axis imager pointing system 132 utilizes the pointable mirror system 24 of FIG. 2. Recall that the two-axis mirror gimbal 38 can only displace the planar mirror 36 along the two orthogonal axes 39, 40. This mirror displacement corrects for apparent translational motion in image displacement in an up/down or left/right direction of the imager assembly respectively, or their directional equivalents in space. Therefore, if the satellite is also rotating, caused by jitter or drift, about the third axis 81, then rotation of the focal plane arrays 43 are required to compensate for the motion as illustrated in FIG. 7.

Figure 6:
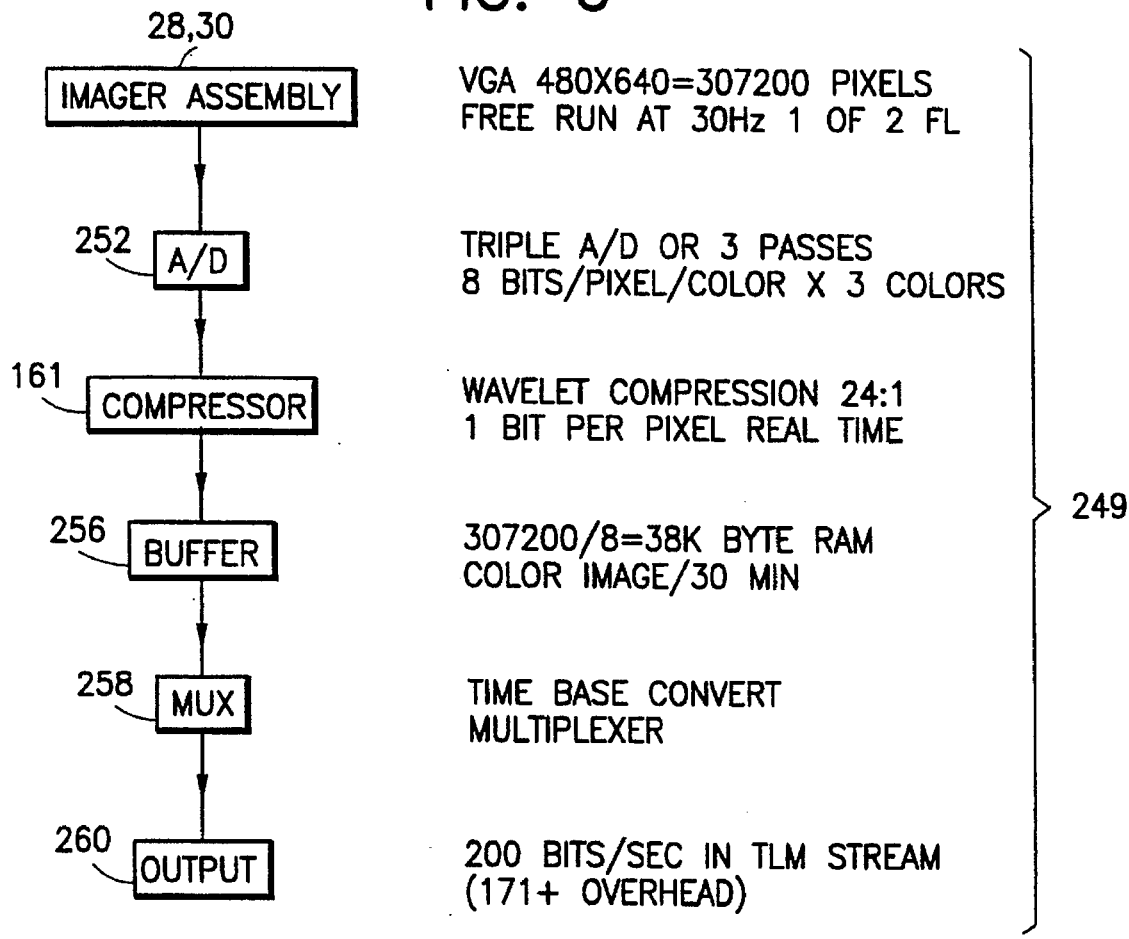
FIG. 6 is a block diagram illustrating the logic followed by one implementation of the imager of the data transmission path of the present invention.

The imaging system 113 includes an imager optics system 134, the filter wheel 65 or 75 (which selects the spectral band of the photonic radiation which is applied to the imager focal plane assembly), the focal plane arrays 62, 72, and the focal plane electronics 64, 74 which include a signal conditioner (not illustrated) and an analog to digital converter 252 (see FIG. 6). The imager optics system can include a VR zoom lens 134 which is applied to the VR imager assembly 30, as well as an IR zoom lens 79 which is applied to the IR imager assembly 28. The filter wheel includes the IR multi-position filter wheel 65 and the VR multi-position filter wheel 75 and the associated electronics. The filter wheels 65, 75 determine the spectral bands of the photonic radiation which is applied both along the first radiation path 54 to the IR imager assembly 28, and along the second radiation path 56 to the VR imager assembly 30.

The cryo-engine cooler 32 is typically required only to cool the IR focal plane array 62, and not the VR focal plane array 72 to cryogenic temperatures to permit proper operation. The configuration of the IR cooler 32 depends largely upon the design parameters of the IR focal plane array 28. Applying the cryo-engine cooler 32 to the IR focal plane array 62 of the IR imager assembly 28 significantly enhances the image signal-to-noise ratio of the output of the IR imager assembly 28. This cooler can either be of a type which does not require a clear field-of-view to cold space (e.g., a Stirling cycle or pulsed tube cooler), or can require a clear field-of-view to cold space (e.g., a passive radiative cooler).

The focal plane electronics 64, 74 includes circuitry that is necessary to control the operation and readout of the focal plane array 62, 72. The focal plane electronics 64, 74 and subsequent electronics 160 and 256 must also be radiation hardened and be electronically stable in the harsh environment of space for many years. Using the above described configuration for the focal plane electronics, one complete image can be created and transmitted back to Earth each minute. If more bandwidth is allotted to transmissions of signals from the imaging system 22, then images can be transmitted more frequently. Additionally, if the focal plane array 62, 72 is formed with fewer pixels, then complete images may be transmitted more frequently.

Figure 3:
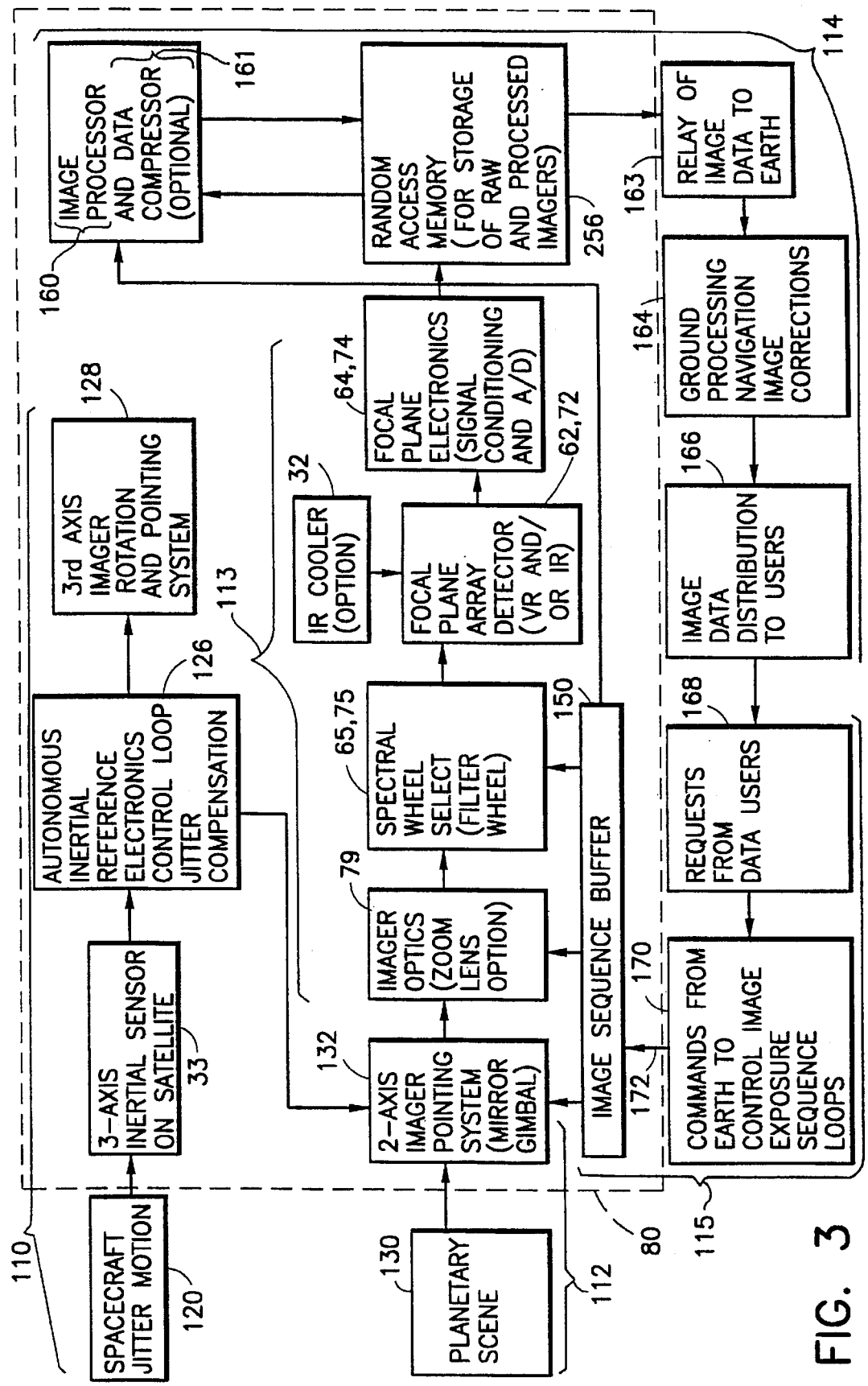
FIG. 3 is a block diagram illustrating one embodiment of the logic used by one embodiment of a computer program and electronics hardware which controls the operation of the imaging system.

An image sequence buffer 150 of FIG. 3 applies output signals to the two-axis imager pointing system 132, the imager optics system 134, the filter wheels 65, 75, an optional image processor 160 and an optional compression element 161. The image buffer 150 may be controlled by the command and control segment 115 as described below. The command and control segment 115 provides data signals to the image sequence buffer 150 relating to when, how, and under what conditions the above systems 65, 75, 79, 132, 134, 160, and 161 are to operate. The image sequence buffer 150 is located aboard the satellite, and converts the incoming data signals into a signal which is capable of actuating the respective systems 65, 75, 79, 132, or 134 which the data signal is directed at, in the desired manner indicated by the data signal.

The transmission segment 114 includes an optional image processor system 160 and/or the optional data compression system 161; a random access memory (RAM) 256; a relay of image data to Earth section 163, a ground processing navigation image and correction 164; and an image data distribution to user system 166. Both elements 160 and 161 are illustrated within one box in FIG. 3, but these two systems may each be applied to the present invention either alone, both excluded, or both included. The RAM 256 stores the data relating to the images created by the imaging system 22 until such time as it has been transmitted to Earth, and acknowledged. The relay of image data to Earth 163 involves establishing a communication link between a transmitter located aboard the satellite and a receiver located on Earth (not illustrated).

In this disclosure, the use of the term "image processing" is used to refer to generally known processing techniques using digital, as well as analog, computers. However, since digital computers are capable of processing large amounts of information relatively quickly, it is envisioned that the image processing is be accomplished much more often using digital techniques. Such image processing techniques may involve pixel averaging, summing, multiplying, and any operation where an operation is performed using the pixel values at two corresponding pixel locations in more than one image.

The optional image processing section may perform a variety of functions. For example, the two images may be considered as covering the same planetary scene or field of view if there are multiple images created at almost the same time over nearly the same planetary scene or field of view 130. The image processor 160 can construct a complex image from more than one image to provide more information than may be obtained by a single image alone. This process of combining two or more images from the same planetary scene or field of view (using the same or a different imager assembly) is known as co-registration of images. The VR focal plane array 65 can provide several images which are processed into a color image using known techniques. The complex image may use inputs from both the IR and the VR image assemblies 28, 30. The ratios of inputs from each image may be altered in order to obtain different information. For example, in order to determine certain types of cloud formations, several different IR and/or visible images (at certain ratios which may be determined empirically or by using common knowledge) may be combined and/or subtracted utilizing known signal processing techniques. While image processing may actually be performed in the satellite (by block 160) or on the Earth (by block 164 of FIG. 3), it is often preferred that the device performing image processing functions be located aboard the satellite. A more compact signal is thereupon transmitted from the satellite to the Earth based receiver. The structure of computers which perform signal processing are well known in the signal processing or image processing arts as illustrated in the text *Digital Image Processing*, Gonzales and Woods, Addison Wesley, 1992.

In pixel averaging the values of four, or sixteen, adjacent pixels are averaged (or combined by some other statistical technique) in order to derive some value representative of all four, or sixteen, pixels. Averaging, in addition to data compression as described below, reduces the volume of data required to be transmitted from the satellite to the Earth. Additionally, the image processing averaging technique functions as an electronic zoom lens.

The data compressor 161 functions in a known manner to compress the signal being transmitted from the satellite to the receiver. Compression systems are also well known in the signal transmission area, and are understood to function best when the signal being compressed is not very random (has long strings of 0's or 1's), or when most of the image or signal is changing slowly. Since satellite image processing often produces images which have larger regions which are of a similar color (oceans, space, etc.), data compression can result in a significant decrease in the amount of data being transmitted. Whatever compression algorithm is used on board the satellite, a reverse expansion algorithm is located at the receiver to expand the compressed data. Both the image processor 160 and the data compressor 161 are controlled by the image sequence buffer 150, and therefore may be controlled by Earth based human controllers.

The on-board data compression capability permits rapid transmission of image data over radio links of limited bandwidth. This includes the software used by the controller located on the spacecraft, and corresponding data restoring algorithms used by computers located at the ground station. Data compression can also result from on-board averaging of pixels (e.g., in clusters of 4 or 16) within the imaging system. This can alternatively be accommodated by zooming the imager optics by ground command.

Information from multiple imaging systems 22 located on two or more satellites may be combined using image processing techniques to provide a three dimensional stereo image. For example, if it is important to determine the three dimensional shape of a cloud, two separated satellites located in different positions with respect to the same cloud can each take an image of the cloud. The corresponding locations of the clouds can be correlated and combined between the two images in the form of a three dimensional grid outline to provide a three dimensional image of the cloud utilizing known image processing techniques. This follows since one imaging system can only determine direction (along a single axis) of a particular object such as a region of the cloud, landmass, etc.; while two imaging systems can determine the exact position (by cross fix) of the object. It is important that rapid imaging systems (such as in the present invention) be utilized to create such stereo images since stereo images rely upon combination of two or more images taken at the same time. If either imager requires a relatively long period to create an image, the precise location of the object can change making the stereo imaging techniques uncertain. If the prior art system, which requires over twenty minutes to create a single image, were utilized, the absolute position of any region of the image, or the time at which a particular location of that segment of an image was taken, often cannot be determined with sufficient accuracy.

Figure 4:
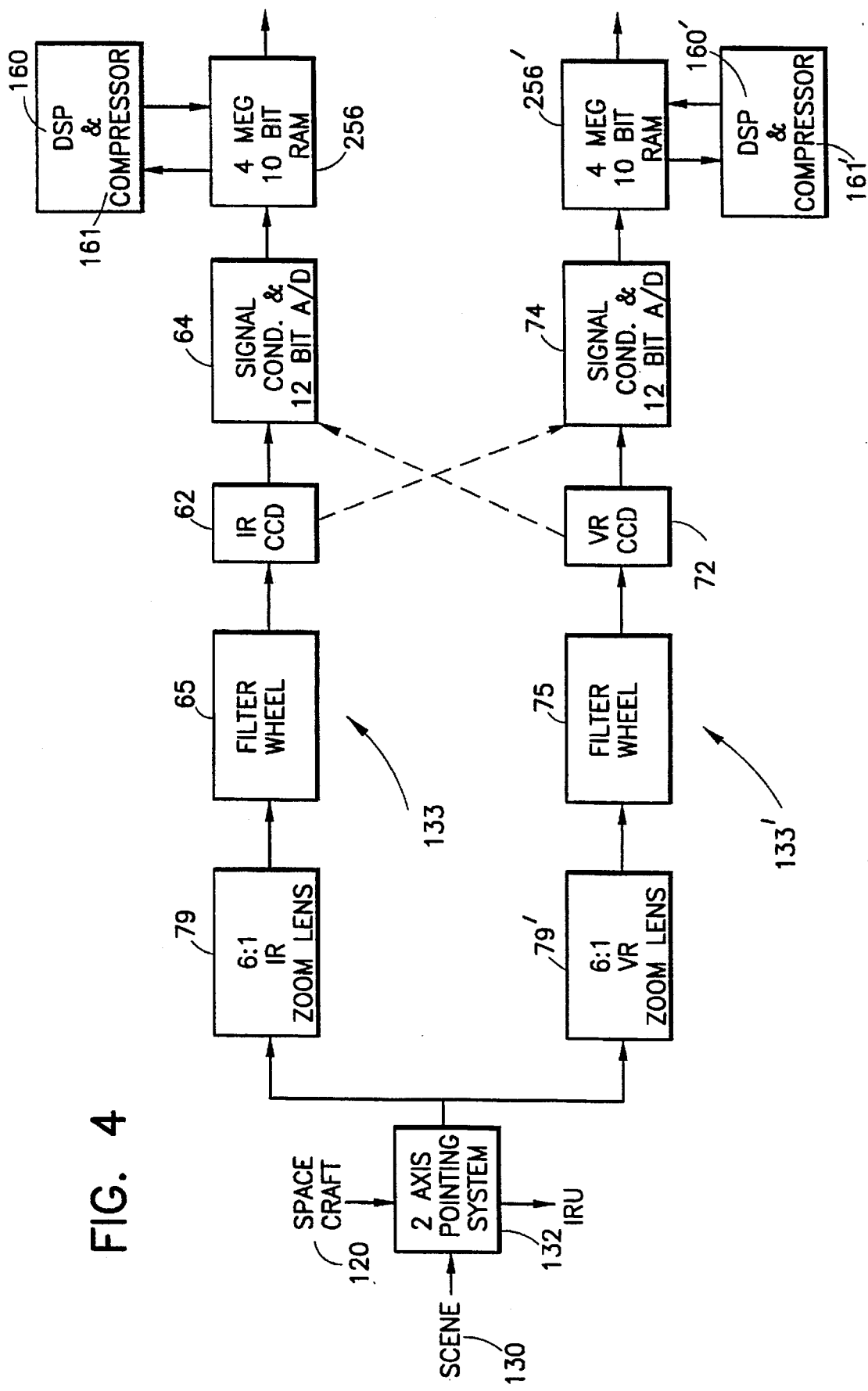
FIG. 4 is a block diagram illustrating the interrelation between IR (infrared) and the VR (visible radiation) imager sections.

The RAM 256 in FIG. 3 and FIG. 4 functions as an image memory buffer for data being transmitted to Earth, to store one or more images from the focal plane electronic system 64, 74. This becomes especially significant if multiple images are being combined or processed by the image processor 256. The RAM 160 acts as an on-board image memory buffer for the data being transmitted back to the Earth. The on-board image memory buffer (part of the RAM 256) permits storage of several images recorded in different wavelength bands in rapid succession, and thus permits these images to be co-registered (subsequently combined). Later, as part of data analysis in ground processing, ratios of intensities at different wavelength bands for each pixel can be calculated (corresponding to the same planetary scene or field of view 130).

The relay of data section 163 performs the function indicated in its name. Data may be transmitted to Earth in section 163 from the imaging system itself, and it is also within the scope of the present invention to transfer the data to the communication segment of the satellite communication system, and embed the image data in the data signal being transmitted to Earth from the communication satellite itself. In the latter, the signal from the satellite to the Earth is modified so that it can transmit either data from the satellite itself, or combined data from the satellite and the imager system. This signal modification includes configuring the header to describe whether imager system information is contained in a particular signal transmission. If the signal does contain imager system data, then some frame format is followed in the relay of image of data to earth 163 describes where the data relating to the relay satellite function is located within each frame, and where the data relating to the imager system is located within each frame.

Combining the data transmitters of the satellite and the imager system can significantly increase the image data bandwidth to the Earth since satellite transmitters are often allotted greater signal bandwidth than spacecraft telemetry transmitters. Combining the satellite and imager transmitters also reduces the cost of the sensor and/or ground equipment due to limiting redundancy associated with the use of multiple systems and avoiding the need for onboard data compression and storage of large numbers of images.

The ground processing navigation image and correction section 164 acts to ensure that the data signal received by the Earth is the same signal recorded by the imaging system. Additionally, the ground processing navigation and correction section 164 may perform image processing similar to those described in the image processor 160 (if the signal processing section is not present or energized in the satellite). The corrections from the ground processing navigation and corrections section 164 permits co-registration of images recorded in the presence of significant spacecraft movement with respect to the planet's surface. The ground processing navigation image and correction section 164 can also provide co-registered images on the Earth when there is significant jitter and drift, utilizing known image processing techniques.

The image data distribution to user system 166 performs the function that its name implies, and often uses a distinct transmission system (such as cable or a separate relay satellite) to transmit the images to the user. This may be accomplished using transmission of the data to the user system via ground or satellite links, and a display of the data using a cathode ray tube, a printout, a computer monitor, or any other type of suitable display or recording system. Such display systems are well known, and are not further described.

The command and control segment 115 includes a request from data user segment 168, a commands from Earth section 170 and the above referred to image sequence buffer 150. The segment 168 provides an interface by which the user, who is located on Earth, may communicate a signal commanding the imaging system to create, and transmit, whatever images are desired (location of images, as well as filters which are applied to each filter wheel during creation of the images). Segment 168 can include an Earth-based computer to translate the location of the desired planetary scene or field of view 130 which is input to the user into a coordinate system which can be understood by the imaging system. The imaging system then does not have to perform any complex computations to determine where to image. The commands from Earth section 170 may also include an interface segment (not shown) whereby the user may provide command and control signals to the satellite. The interface segment may include an attached modem. The modem is electronically connected to a wireless signal data link 172 which provides signals to the image sequence buffer 150.

FIG. 4 illustrated how some of the different segments of the FIG. 3 block diagram are broken down into two distinct paths 133, 133'. The path 133 relates to structure of the IR imager assembly 28, while the path 133' relates to structure of the VR imager assembly 30. Some of the segments (79, 160, 161, 256) of the second path 133' are provided with the same reference characters as the corresponding segments of the first path, except with a primed (') notation.

FIG. 5 is a flowchart of a segment of the controller 99. FIG. 5 includes the inertial sensor 33; an Actual Position Compared to Desired Position Step 202; a Desired Position Step 204; a Convert X-Axis Step 206; a Convert Y-Axis Step 208; a Convert Z-axis Step 210; a Rotate X-Axis Step 212; a Rotate Y-Axis Step 214; a Rotate Flex Pivot Step 216; an End Cycle Step 218; and an Add Inertial Sensor Correction Step 220. Steps 202, 206, 208, 210, 212, 214, 216, 218, and 220 are performed in the controller 99 (FIG. 2) which is located within the imager system 22. The inertial sensor 33 derives positional data and/or other visible cues and derives the actual location and orientation of the satellite. The data provided by the inertial sensor 33 can be corrected by determining the precise location of the satellite as illustrated in U.S. Pat. No. 5,204,818 issued Apr. 20, 1993 to Landecker et al. (incorporated herein by reference in its entirely). The position information obtained by inertial sensor 33 is derived quickly enough to accurately correct for drift and vibrations produced in the imagers.

Step 204 compares the actual position and orientation of the imager assemblies, as obtained by the inertial sensor 33, and compares this to the desired position as obtained in step 204 based on a signal transmitted from Earth (stored in the image sequence buffer 150 of FIG. 3). Step 202 compares the actual location and orientation of the planar mirror with the desired position (utilizing the position and orientation of the satellite as well as the relative orientation of the planar mirror relative to the satellite). Since any deflection from the actual planar mirror position to the desired planar mirror position typically requires deflection along all three axes, the displacement which must be applied to the planar mirror 36 of FIG. 2 is converted into the necessary X, Y and Z displacements.

For the purpose of this disclosure, the X axis and Y axis are considered as two orthogonal axes 39 and 40 respectively, while the Z axis is taken as axis 81. Steps 206, 208 and 210 calculate the necessary rotation displacement to the planar mirror, about each of the X and Y axes, which is required to rotate the planar mirror into the desired position. The motion sensed about the Z axis is corrected by rotation of the focal plane about the Z axis using the FIG. 7 system. The desired displacements about each of the X, Y and Z axes are performed in Steps 212, 214 and 216. Steps 212 and 214 each accomplish the rotation by actuation of one or more torque motors which rotate the planar mirror 36 about the pivot point 40. Step 216 is accomplished by rotating the imager array within each imager assembly (either 28 or 30 of FIG. 2) about the flex pivot 300 by a torque motor or piston type driver. All of the motors used to adjust the imager array of the imager assemblies about the X, Y or Z axes are monitored by an angle sensor or linear displacement sensor, such that a displacement by a certain magnitude is known to rotate or displace the image a certain known number of degrees. The above rotations about each of the X, Y, and Z axes can be performed simultaneously.

Step 218 indicates the end of each cycle. Since differences between the actual positions and desired positions can be monitored continuously and very rapidly, it is unlikely that the planar mirror has to be adjusted a large number of degrees to null any spacecraft motion. However, there is also the command option to move the sensor mirror over a large angle as a stepped displacement of the planar mirror servo. The new desired pointing direction of the respective imager assembly can then be achieved very rapidly. As a result of the control method of FIG. 5, the imager assembly should be directed at the same planetary or stellar location regardless of jitter or drift induced by the satellite platform.

Step 220 compensates for known displacement of the planar mirror from the desired position. For example, if a user of the imaging system knows that the image is displaced from the desired location (and the planar mirror is not being displaced at all during several cycles indicating that the microprocessor believes the planar mirror is already in its desired position), then a person on the ground can supply override information for precisely adjusting the position at which one or more of the imager assemblies are directed. This can alternatively be accomplished as a correction input to step 204.

FIG. 6 is a block diagram of a progression of the components located on board the satellite involved in establishing a transmitter segment 249 from one of the imager assemblies 28, 30 to the Earth. The components of FIG. 6 include the imager assemblies 28, 30, an analog to digital (A/D) converter 252, the compressor 161, the buffer 256, a multiplexer 258, and an output component 260. A suitable configuration for each of the above elements is illustrated next to the respective element in FIG. 6.

The A/D converter 252 is used to translate an analog signal representative of the outputs of the imager assemblies 28, 30 into a digital signal which may be more accurately transmitted from space to a Earth receiver. The multiplexer 258 functions to control the transmission from each of the imager assemblies 28, 30. The multiplexer may use lossy or lossless communication protocols. Lossy communication protocols are sometimes preferred since the transmission rate is higher, and the if some minute percentage of the data relating to the images is lost in the present application, then the image can still be reconstructed. Typically, digital data from the imager assemblies 28, 30 which is stored in the buffer (RAM) 256 is packetized. The packetized data from each oft he imager assemblies is transmitted using some protocol wherein the data from both images may be transmitted (such as code division multiple access, time division multiple access, or frequency division multiple access).

The output 260 is a combination of a transmitter and antenna which is capable of establishing the transmitting side of a data link. Such data rates as 200 bits/second may be utilized in a telemetry stream using known equipment.

While the invention has been particularly shown and described with respect to preferred embodiments thereof, it is understood by those skilled in the art that changes in form and details may be made therein without departing from the scope and spirit of the invention.

What is claimed is:

1. An imaging system disposed on a satellite, comprising:
   a pointable mirror for reflecting radiation in a predetermined radiation wavelength band;
   a two-axis mirror pointing system coupled to the pointable mirror for moving the mirror in response to applied control signals;
   an image sensor for generating images in response to radiation incident thereupon;
   a three axis inertial sensor disposed proximate to the image sensor for detecting motion of the satellite in two orthogonal sensed angular directions, and about a sensed rotary direction, and for outputting signals indicative of the detected motion of the satellite; and
   a controller coupled between the inertial sensor and the pointable mirror system for generating the control signals that move the mirror in response to signals generated by the inertial sensor that are indicative of motion of the satellite in the sensed angular directions to prestabilize the images reflected by the pointable mirror and minimize short term jitter and long term drift caused by motion of the satellite in the sensed angular directions, and coupled between the inertial sensor and the image sensor for rotating the image sensor in response to signals generated by the inertial sensor that are indicative of motion of the satellite in the sensed rotary direction to correct the sensed image about a line of sight of the image sensor;
   and wherein successive images sensed by the image sensor are prestabilized to minimize jitter, drift and rotational errors induced in the images that are caused by motion of the satellite.

2. The imaging system of claim 1 wherein the image sensor is an infrared focal plane array sensor.

3. The imaging system of claim 2 wherein the infrared focal plane array sensor comprises a staring focal plane array.

4. The imaging system of claim 2 wherein the infrared focal plane array sensor comprises a scanning focal plane array imager.

5. The imaging system of claim 1 wherein the image sensor is a visible focal plane array sensor.

6. The imaging system of claim 5 wherein the visible focal plane array sensor comprises a staring focal plane array.

7. The imaging system of claim 5 wherein the visible focal plane array sensor comprises a scanning focal plane array imager.

8. The imaging system of claim 1 wherein said three axis inertial sensor comprises a plurality of gyros.

9. The imaging system of claim 1 further comprising:
   zoom means disposed between the pointable mirror and the image sensor for changing the effective magnification of the imaging system.

10. The imaging system of claim 9 wherein said zoom means comprises an optical zoom lens.

11. The imaging system of claim 9 wherein said zoom means comprises an image processing device.

12. An imaging system disposed on a satellite, comprising:

a pointable mirror for reflecting radiation in predetermined infrared and visible radiation wavelength bands;

a two-axis mirror pointing system coupled to the pointable mirror for moving the mirror in response to applied control signals;

a beamsplitter for directing infrared radiation reflected from the pointable mirror system along a first path and for directing visible radiation reflected from the pointable mirror system along a second path;

an imager comprising an infrared focal plane array sensor disposed along the first path for generating images in response to infrared radiation incident thereupon, and a visible imaging sensor disposed along the second path for generating images in response to visible radiation incident thereupon;

a three axis inertial sensor disposed proximate to the image sensor for detecting motion of the satellite in orthogonal sensed pitch and yaw angular directions, and about a sensed rotary direction, and for outputting signals indicative of the detected motion of the satellite; and a controller coupled between the inertial sensor and the pointable mirror system for generating the control signals that move the mirror in response to signals generated by the inertial sensor that are indicative of motion of the satellite in the sensed angular directions to stabilize the images reflected by the pointable mirror and minimize short term jitter and long term drift caused by motion of the satellite in the sensed angular directions, and coupled between the inertial sensor and the imager for rotating the imager in response to signals generated by the inertial sensor that are indicative of motion of the satellite in the sensed rotary direction to correct the sensed image a line of sight of the image sensor;

and wherein successive images sensed by the imager are prestabilized to minimize jitter, drift and rotational errors induced in the images that are caused by motion of the satellite.

13. The imaging system of claim 12 wherein the focal plane array sensor is a staring focal plane array imager.

14. The imaging system of claim 12 wherein said focal plane array sensor is a scanning focal plane array imager.

15. The imaging system of claim 12 wherein said three axis inertial sensor comprises a plurality of gyros.

16. A method of stabilizing images generated by an imaging system disposed on a satellite, wherein the imaging system comprises a pointable mirror, an imager for generating images in response to radiation incident thereupon and reflected by the pointable mirror, an inertial sensor for detecting motion of the satellite and for outputting signals indicative thereof, and a controller coupled to the inertial sensor, the pointable mirror and the imager for providing control signals in response to output signals from the inertial sensor that are indicative of the detected motion of the satellite, said method comprising that steps of:

sensing motion of the satellite in three orthogonal sensed angular directions;

moving the pointable mirror in response to control signals applied thereto to stabilize the images reflected by the pointable mirror and minimize short term jitter and long term drift in the sensed images caused by motion of the satellite in the orthogonal sensed angular directions; and rotating the imager in response to signals generated by the inertial sensor that are indicative of motion of the satellite in the sensed rotary direction to correct the sensed images for rotational motion of the satellite about its nadir axis;

and wherein successive images sensed by the imager are prestabilized to minimize jitter, drift and rotational errors induced in the images that are caused by motion of the satellite.

\* \* \* \* \*